United States Patent [19]

Vuyovich

[11] 4,296,629
[45] Oct. 27, 1981

[54] PISTON TOP-DEAD-CENTER DETECTOR

[76] Inventor: John M. Vuyovich, 1369 McDuff St., Los Angeles, Calif. 90026

[21] Appl. No.: 104,374

[22] Filed: Dec. 17, 1979

[51] Int. Cl.$^3$ .......................................... G01M 15/00
[52] U.S. Cl. .............................. 73/116; 200/DIG. 17; 340/686
[58] Field of Search ............... 73/117.2, 116; 116/202, 116/208, 230, 281, 306, 307, 312, 321, 324; 33/DIG. 15; 200/DIG. 17, 61.41, 61.42; 340/686

[56] References Cited

U.S. PATENT DOCUMENTS 2,072,984  3/1937  Haskins .................. 200/DIG. 17 X
4,206,455  6/1980  Isakson ..................... 33/DIG. 15 X Primary Examiner—Jerry W. Myracle
Attorney, Agent, or Firm—Fraser and Bogucki

[57] ABSTRACT

A piston top-dead-center detector includes an adapter capable of being screwed into a sparkplug hole in an internal combustion engine, a length of electrically insulating hollow tubing disposed within a hollow interior in the adapter and a conductive rod slidably disposed within the tubing so as to be slidable relative to the adapter. With the adapter installed in a sparkplug hole, the end of the rod outside of the internal combustion engine is coupled to the positive terminal of the engine coil through a lamp. The engine is rotated so that the corresponding piston in the sparkplug hole in which the adapter is installed engages the end of the rod within the engine and pushes the rod within the insulating tubing in the adapter to an extreme position at the top-dead-center position of the piston. Thereafter, when the piston again reaches the top-dead-center position the electrically grounded piston contacts the conductive rod to complete a circuit from the positive coil terminal and thereby illuminate the lamp to designate the top-dead-center piston position.

8 Claims, 5 Drawing Figures

U.S. Patent    Oct. 27, 1981    4,296,629
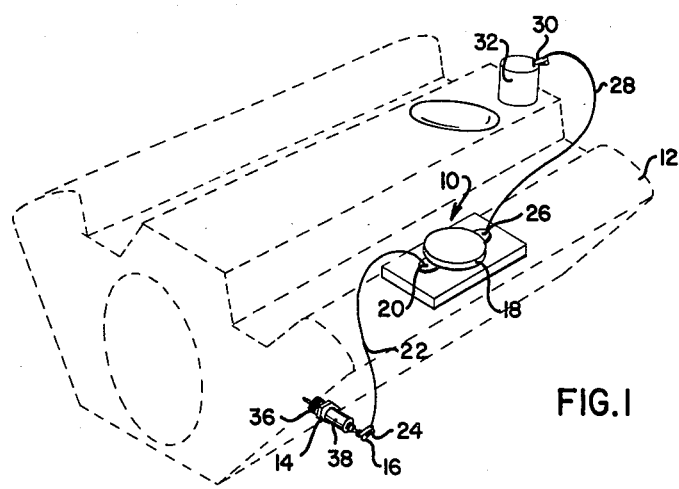
FIG.1
FIG.2
FIG.3
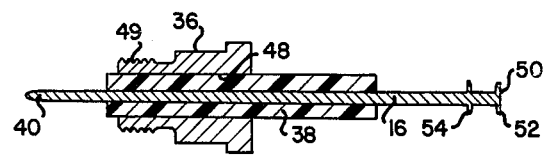
FIG.4
FIG.5
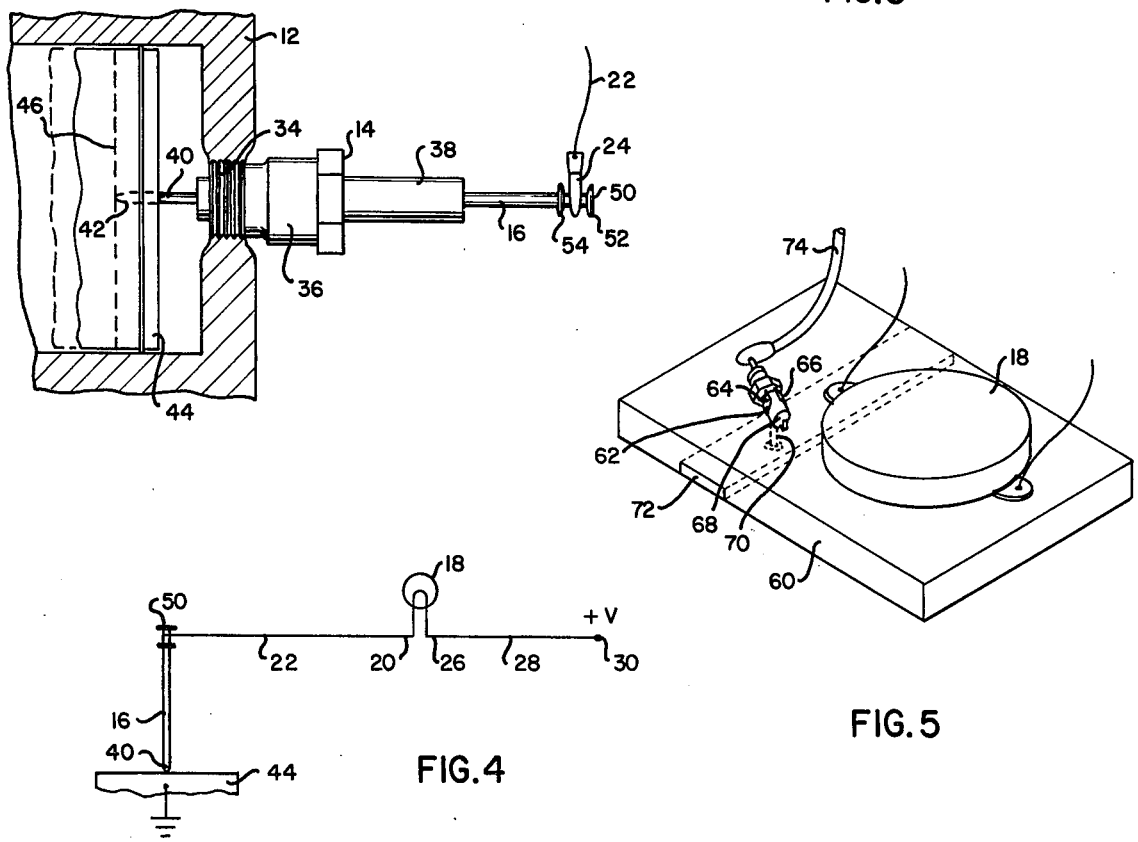

PISTON TOP-DEAD-CENTER DETECTOR

BACKGROUND OF THE INVENTION

1. Field of the Invention

The present invention relates to equipment used in adjusting and servicing internal combustion engines such as automobile engines, and more particularly to an arrangement for indicating when a piston of an internal combustion engine has reached the top-dead-center position.

2. History of the Prior Art

When tuning an automotive or similar internal combustion engine it is often desirable that the distributor be removed from the engine for cleaning and servicing as well as easier installation of new points. However, there is a reluctance on the part of many mechanics, both professional and amateur, to remove the distributor from the engine. This stems from the fact that if the engine is rotated with the distributor removed, it is often difficult for the mechanic to determine the top-dead-center position of one of the engine pistons upon reinstallation of the distributor so that the engine may thereafter be started and more precise adjusting and tuning accomplished.

The conventional technique for attempting to determine the top-dead-center position of a piston upon reinstalling a removed distributor requires two persons to accomplish and is haphazard at best. One person places his finger or thumb over the sparkplug hole of a convenient reference piston such as the number one piston. The second person climbs inside the auto and repeatedly turns on the ignition for short intervals to rotate the engine in increments. When the piston reaches top-dead-center during the compression stroke, pressurized air tends to force the thumb or finger of the first person away from the sparkplug hole. Aside from being crude and somewhat haphazard, this technique is limited to a two man operation because of the virtual impossibility for one person to hold their finger over the sparkplug hole and at the same time turn on the ignition.

Accordingly, it is an object of the invention to provide a detector for indicating rather precisely when a piston has reached the top-dead-center position.

It is a further object of the invention to provide a piston top-dead-center detector utilizing a flashing lamp or other warning device which is detectable at a location removed from the engine compartment such as from the inside of the vehicle.

It is a still further object of the invention to provide a piston top-dead-center detector useful in a variety of different operations such as ascertaining the timing of the engine as well as aiding in the reinstallation of the engine distributor.

BRIEF SUMMARY OF THE INVENTION

These and other objects are accomplished in accordance with the invention by a piston top-dead-center detector which provides an illuminated lamp or other readily discernible indication when a piston reaches the top-dead-center position. The lamp or other warning device may be located so as to be readily detectable by a person at a location outside of the engine compartment such as within the vehicle. The detector is relatively simple, compact and of low cost.

A preferred embodiment of a piston top-dead-center detector in accordance with the invention includes an adapter assembly having a conductive rod coupled via a wire to one of the terminals of an electrical lamp. The other lamp terminal is coupled by a wire to an electrical clamp. With the clamp coupled to an element having an electrical potential different from that of the normally grounded engine pistons such as the positive terminal of the engine coil, a circuit to the lamp is completed when a piston comes into contact with the rod in the adapter assembly. The rod is slidably mounted within the adapter assembly so as to be pushed into an extreme position as the piston moves into the top-dead-center position. Thereafter, each time the piston reaches the top-dead-center position upon rotation of the engine the lamp is momentarily illuminated.

In a preferred embodiment of the adapter assembly the rod is mounted within the hollow interior of a length of tubing having a shorter length than the rod. The length of tubing frictionally engages the rod so as to prevent free sliding movement of the rod therein while at the same time permitting some sliding movement of the rod when force is applied to the rod. The length of tubing is rigidly mounted within the hollow interior of a generally cylindrical adapter. The adapter has a threaded exterior designed to be screwed into a sparkplug hole in the engine. The length of tubing is preferably made of insulating material so as to insulate the conductive rod from the adapter which comes into contact with the grounded engine block. The lamp may be mounted on a common base with a resilient clamp for holding the adapter assembly when not in use. During use of the detector the sparkplug corresponding to the hole in which the adapter assembly is installed may be placed in the resilient clamp for easy viewing in conjunction with the lamp. The clamp is coupled to a conductive strip at the bottom of the common base to ground the sparkplug to the engine block. Sparking of the plug identifies the compression stroke of the piston.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 1 is a perspective view of a piston top-dead-center detector in accordance with the invention;

FIG. 2 is a sectional view of the adapter assembly of the detector of FIG. 1 shown installed within a sparkplug hole;

FIG. 3 is a sectional view of the adapter assembly of FIG. 2;

FIG. 4 is an electrical schematic diagram of the detector of FIG. 1; and

FIG. 5 is a perspective view of part of an alternative embodiment of a piston top-dead-center detector in accordance with the invention.

DETAILED DESCRIPTION

FIG. 1 depicts a piston top-dead-center detector 10 in accordance with the invention. The detector 10 is shown in an operative position with respect to an internal combustion engine 12 which is shown in phantom. The detector 10 includes an adapter assembly 14 having a conductive rod 16. An electrical lamp 18 has a first terminal 20 thereof coupled via a wire 22 and an electrical clamp 24 to one end of the conductive rod 16. The lamp 18 has a second terminal 26 coupled via a wire 28 to an electrical clamp 30.

The lamp 18 is illuminated when the clamp 30 is coupled to an electrical potential which differs by some nominal amount from the electrical potential of the conductive rod 16. By coupling the electrical clamp 30 to the positive terminal of a coil 32 of the engine 12, the lamp 18 is illuminated whenever the conductive rod 16 is grounded. The conductive rod 16 in turn is grounded whenever it is contacted by a piston within the engine 12. The adapter assembly 14 which includes the conductive rod 16 is shown installed within a sparkplug hole 34 in the engine 12. The adapter assembly 14 includes an adapter 36 mounted within the sparkplug hole 34 and a length of insulating tubing 38 mounted within the adapter 36. The tubing insulates the conductive rod 16 from the adapter 36 while at the same time permitting movement of the rod 16 relative to the adapter 36 and the tubing 38 when force is applied to the rod 16. If the adapter 36 is made of metal, the length of tubing 38 prevents the conductive rod 16 from being electrically coupled to the engine block.

FIG. 2 depicts the manner in which the adapter assembly 14 is positioned within the sparkplug hole 34 in the block of the engine 12. With the adapter 36 screwed into place in the sparkplug hole 34, the conductive rod 16 is pushed within the tubing 38 until it assumes an extreme position in which an end 40 thereof disposed inside of the engine assumes a position shown by the dotted outline 42. If the engine 12 is slowly rotated by briefly and repeatedly turning on the ignition, a piston 44 moves toward the rod 16 until it contacts the end 40 at a position shown by the dashed line 46 in FIG. 2. When the piston 44 comes into contact with the end 40 of the rod 16, the terminal 20 of the lamp 18 is electrically grounded and the lamp is illuminated.

As rotation of the engine 12 is continued, the piston 44 pushes the conductive rod 16 outwardly relative to the adapter 36 and the tubing 38 until the end 40 of the rod 16 assumes an extreme opposite position shown in FIG. 2 with the piston 44 at the top-dead-center position. Continued rotation of the engine 12 withdraws the piston 44 from contact with the end 40 of the rod 16, causing the lamp 18 to go out. Thereafter, when the piston 44 next reaches the top-dead-center position, the piston contacts the end 40 so as to ground the conductive rod 16 and momentarily illuminate the lamp 18. This provides a precise visual indication of when the piston 44 has reached the top-dead-center position.

The details of the adapter assembly 14 are better shown with reference to FIG. 3. The adapter 36 is of generally cylindrical configuration and has a hollow interior 48 therein. A set of threads 49 on the outside of the adapter 36 are configured to screw into the sparkplug hole 34. The length of tubing 38 which has a length greater than that of the adapter 36 so as to extend beyond the opposite ends of the adapter 36 is rigidly mounted within the hollow interior 48 of the adapter 36. The conductive rod 16 has a length greater than the tubing 38 so as to extend beyond the opposite ends of the length of tubing 38. The rod 16 has an end 50 opposite the end 40 which is adapted to receive the clamp 24. The end 50 is provided with a spaced-apart pair of annular flanges 52 and 54 which tend to confine the clamp 24 in place on the end 50 and prevent the clamp 24 from migrating along the length of the rod 16 due to vibration and other factors.

The diameter of the conductive rod 16 is at least as great as the inner diameter of the length of tubing 38 to provide for a reasonably snug fit of the rod 16 within the tubing 38. This prevents the rod 16 from sliding within the tubing 38 in the absence of application of force to the end 40 of the rod 16 such as by the piston 44. The adapter 36 may be made of nonconductive material such as plastic, in which event the adapter and the length of tubing 38 can be integrally formed as a single element which insulates the conductive rod 16 from the grounded block of the engine 12. If the adapter 36 is made of metal or other conductive material, the insulating tubing 38 is necessary to insulate the conductive rod 16 from the adapter 36.

In accordance with the invention the top-dead-center position of the piston 44 is determined by screwing the adapter 36 of the adapter assembly 14 into the sparkplug hole 34. The conductive rod 16 is pushed into the tubing 38 as far as it will go so that the end 40 is in the dotted position 42 shown in FIG. 2. With the adapter assembly 14 so installed, the clamp 24 is attached to the end 50 of the conductive rod 16 and the other clamp 30 is coupled to the positive terminal of the coil 32. The lamp 18 is disposed at a convenient location either in or near the engine compartment so that it can be easily viewed from the inside of the vehicle. The ignition is then turned on in short intervals to slowly rotate the engine 12. The piston 44 eventually comes into contact with the end 40 of the conductive rod 16, causing the lamp 18 to illuminate. The lamp 18 remains illuminated as the piston 44 pushes the conductive rod 16 into the upper extreme position shown in FIG. 2. Termination of illumination of the lamp 18 indicates that the piston 44 has reached the top-dead-center position and has begun movement in the opposite direction. Rotation of the engine by intermittent energization of the ignition is continued until the piston 44 approaches the top-dead-center position during the compression cycle. The occurrence of the compression cycle is determined using a sparkplug as described hereafter. The distributor may then be installed in the engine 12 with the knowledge that the number one piston is in the firing position.

The knowledge of when one of the pistons of the engine 12 is in the top-dead-center position may be used to advantage in various different ways when servicing or adjusting the engine 12. For example, the timing of the engine 12 can be checked. With the adapter assembly 14 installed in a sparkplug hole as shown in FIG. 1 the sparkplug which belongs in the hole and which is coupled to the distributor via a sparkplug wire is positioned so that the base of the plug contacts the engine block. The positioning of the plug is selected so that the plug can be viewed from inside the vehicle. When the plug is energized, the resulting spark at the base thereof will be visible to a person inside the vehicle. At the same time momentary illumination of the lamp 18 signals when the piston 44 has reached the top-dead-center position. As the ignition is intermittently energized to slowly rotate the engine, the sparking of the plug and the momentary illumination of the lamp 18 can be observed to determine whether the spark precedes, coincides with or follows the assumption of the top-dead-center position by the piston 44.

FIG. 5 depicts a portion of an alternative arrangement of a piston top-dead-center detector in accordance with the invention. The arrangement of FIG. 5 utilizes a common base 60 for mounting the lamp 18 thereon in conjunction with a resilient clamp 62. The resilient clamp 62 is comprised of opposite arms 64 and 66 which are normally biased toward one another by the resiliency of the clamp 62 and which may be pried apart to hold a sparkplug 68 therebetween in clamping engagement. The clamp 62 is of electrically conductive material so as to make electrical contact with the base of the sparkplug 68.

The clamp 62 is mounted on the common base 60 by a bolt 70 of electrically conductive material which extends through the thickness of the base 60 and contacts a bar 72 of electrically conductive material. The bar 72 is inset in and extends across the width of the bottom of the common base 60.

With the common base 60 placed on top of the engine 12 so that the conductive bar 72 contacts the block of the engine or other conductive part of the engine, the base of the sparkplug 68 is grounded to the engine block. This completes a circuit through the sparkplug 68 from a sparkplug wire 74. Accordingly, whenever current is applied to the sparkplug wire 74, the circuit is completed through the sparkplug 68 to ground causing the plug to spark.

The resilient clamp 62 provides a convenient place for storing the adapter assembly 14 when the detector 10 is not in use. The adapter 36 is of similar size and shape to the sparkplug 68 and is readily clamped by the opposite arms 64 and 66. During use of the detector, the adapter assembly 14 is removed from the clamp 62 and installed in the sparkplug hole 34 in the manner previously described. The top-dead-center position of the piston 44 is then determined in the manner previously described. Identification of the compression stroke of the piston 44 is accomplished with the sparkplug 68 placed in the clamp 62. When the piston 44 reaches the top-dead-center position during the compression stroke, the lamp 18 illuminates. At the same time the sparkplug 68 sparks. Because the sparkplug 68 and the lamp 18 are disposed side-by-side on the common base 60, both can be conveniently viewed from inside the vehicle. In this manner the top-dead-center position during the compression stroke can be determined. In addition, the accuracy of the engine timing can be determined by observing the coincidence or lack thereof between the spark of the sparkplug 68 and illumination of the lamp 18 at the top-dead-center position of the piston 44.

While the invention has been particularly shown and described with reference to a preferred embodiment thereof, it will be understood by those skilled in the art that various changes in form and details may be made therein without departing from the spirit and scope of the invention.

What is claimed is:

1. A piston top-dead-center detector comprising the combination of:
    an adapter assembly for making electrical contact with a piston in an internal combustion engine when the piston is in a top-dead-center position, the piston being at a given electrical potential and the adapter assembly comprising a first member adapted to be seated within a sparkplug hole in an internal combustion engine and a second member of electrically conductive material extending through and electrically insulated from the first member, the second member being capable of sliding within the first member and at the same time having a sufficiently snug fit within the first member so as to avoid sliding movement relative to the first member in the absence of the application of a substantial force to the second member;
    an electrical terminal having a different potential from the given electrical potential; and
    a lamp coupled between the adapter assembly and the electrical terminal.

2. The invention set forth in claim 1, wherein the given electrical potential comprises ground potential and the electrical terminal comprises the positive terminal of a coil of an internal combustion engine.

3. The invention set forth in claim 1, wherein the first member has an inner cylindrical bore of given diameter for receiving the second member, the second member being generally cylindrical and having a diameter at least as great as the given diameter of the cylindrical bore.

4. The invention set forth in claim 1, wherein the first member includes an adapter configured to be screwed into a sparkplug hole in an internal combustion engine and having a hollow interior therein and a tube of electrically insulating material mounted within the hollow interior of the adapter and having a hollow interior therein defining the cylindrical bore of given diameter.

5. A piston top-dead-center detector comprising the combination of:
    an adapter of generally cylindrical configuration having a threaded exterior portion adapted to be screwed into a sparkplug hole in an internal combustion engine;
    an electrically conductive rod slidably mounted within the adapter, the rod fitting relatively snugly within the adapter so as to remain in a fixed position relative to the adapter in the absence of the application of a substantial force to the rod;
    a warning device having a pair of terminals;
    means coupling one of the pair of terminals to the conductive rod;
    an electrical clamp; and
    means coupling the other one of the pair of terminals to the electrical clamp.

6. The invention set forth in claim 5, wherein the warning device comprises a lamp, and further including a base having the lamp mounted thereon, a conductive member mounted at the bottom of the base, a clamping element having a pair of resilient arms and means for electrically coupling the clamping element to the conductive member.

7. The invention set forth in claim 5, wherein the adapter is made of metal and has a hollow interior, further including a length of hollow tubing of electrically insulating material rigidly mounted within the hollow interior of the adapter, the rod being slidably mounted within the hollow tubing, and wherein the warning device comprises an electric lamp, the means coupling one of the pair of terminals to the conductive rod comprises a wire and the means coupling the other one of the pair of terminals to the electrical clamp comprises a wire.

8. The invention set forth in claim 7, wherein the length of tubing is of generally cylindrical configuration and is generally concentrically disposed within the adapter and is longer than the adapter so as to extend beyond the opposite ends of the adapter and the rod is of generally cylindrical configuration and is generally concentrically disposed within the length of tubing and is longer than the length of tubing so as to extend beyond the opposite ends of the length of tubing, the rod being frictionally engaged by the length of tubing and being slidable within the length of tubing upon application of force to the rod.

* * * * *